United States Patent
Mugel et al.

(10) Patent No.: US 11,907,325 B2
(45) Date of Patent: Feb. 20, 2024

(54) METHODS AND DEVICES FOR OPTIMIZING PROCESSES AND CONFIGURATIONS OF APPARATUSES AND SYSTEMS

(71) Applicant: MULTIVERSE COMPUTING S.L., Donostia-San Sebastián (ES)

(72) Inventors: Samuel Mugel, Toronto (CA); Román Orús, Donostia-San Sebastián (ES); Saeed Jahromi, Donostia-San Sebastián (ES); Serkan Sahin, Donostia-San Sebastián (ES)

(73) Assignee: MULTIVERSE COMPUTING S.L., Donostia-San Sebastián (ES)

( * ) Notice: Subject to any disclaimer, the term of this patent is extended or adjusted under 35 U.S.C. 154(b) by 538 days.

(21) Appl. No.: 17/213,731

(22) Filed: Mar. 26, 2021

(65) Prior Publication Data
US 2022/0269751 A1    Aug. 25, 2022

(30) Foreign Application Priority Data
Feb. 23, 2021   (EP) ..................... 21382149

(51) Int. Cl.
*G06F 17/11* (2006.01)
*G06N 20/00* (2019.01)
*G05B 13/02* (2006.01)

(52) U.S. Cl.
CPC ............. *G06F 17/11* (2013.01); *G06N 20/00* (2019.01); *G05B 13/021* (2013.01)

(58) Field of Classification Search
CPC ........ G06F 17/11; G06N 20/00; G06N 10/00; G05B 13/021
See application file for complete search history.

(56) References Cited

U.S. PATENT DOCUMENTS

| 9,152,746 B2 | 10/2015 | Troyer et al. |
| 10,691,771 B2 | 6/2020 | Venturelli et al. |
| 2022/0414518 A1* | 12/2022 | You ..................... G06N 10/60 |

FOREIGN PATENT DOCUMENTS

EP    3664099 A1    6/2020

OTHER PUBLICATIONS

European Search Report for European Application No. 21382149.9, dated Jul. 16, 2021, 9 pages.
Markus Hauru et al: "Riemannian optimization of isometric tensor networks", arxiv.org, Cornell University Library, 201 Olin Library Cornell University Ithaca, NY 14853, Jan. 13, 2021 (Jan. 13, 2021), XP081858072, 26 pages.

(Continued)

*Primary Examiner* — Charles R Kasenge
(74) *Attorney, Agent, or Firm* — CANTOR COLBURN LLP (57) ABSTRACT

A computer-implemented method is provided whereby an equation with a cost function for minimization is solved by a tensor network. Coefficients of tensors of the tensor network are modified so as to reduce a value of the cost function in an iterative process until convergence is reached, at which point the concerned Unconstrained Optimization problem is solved and the values of the variables of the cost function are provided.

20 Claims, 4 Drawing Sheets

(56) References Cited

OTHER PUBLICATIONS

Mugel, Samuel et al: "Dynamic Portfolio Optimization with Real Datasets Using Quantum Processors and Quantum-Inspired Tensor Networks", Jun. 30, 2020 (Jun. 30, 2020), XP055821415, Retrieved from the Internet: URL: https://arxiv.org/pdf/2007.00017.pdf [retrieved on Jul. 6, 2021], 11 pages.

Philippe Corboz: "Variational optimization with infinite projected entangled-pair states", arxiv.org, Cornell University Library, 201 Olin Library Cornell University Ithaca, NY 14853, May 10, 2016 (May 10, 2016), XP081399405, 11 pages.

\* cited by examiner

METHODS AND DEVICES FOR OPTIMIZING PROCESSES AND CONFIGURATIONS OF APPARATUSES AND SYSTEMS

CROSS REFERENCE TO RELATED APPLICATIONS

This application is related to and claims the benefit of Spanish Patent Application No. 21382149.9, filed on Feb. 23, 2021, the contents of which are herein incorporated by reference in their entirety.

TECHNICAL FIELD

The present disclosure relates generally to computing devices, and more specifically to methods, devices and systems capable of optimizing processes and configurations of apparatuses, e.g. machines, and systems, e.g. group of apparatuses, after solving an Unconstrained Optimization problem with quantum computing or quantum-inspired computing.

BACKGROUND

The operation or dynamics of many processes, apparatuses or systems are representable by way of equations with multiple terms and variables. Oftentimes it is possible to improve the efficiency of the processes, apparatuses or systems by setting a superior configuration or modifying an existing configuration by a superior one that influences the concerned operation or dynamics. Other than in very simple equations, finding a superior configuration is not straightforward.

The existence of multiple variables and/or complex relationships between the different variables makes the optimization of the equations difficult. Computational complexity theory classifies computational problems by the complexity that exists in obtaining solutions to the problems.

The time it takes to solve many computing problems has been reduced considerably thanks to quantum computing. In this sense, for example U.S. Pat. No. 10,691,771-B2 provides a method for generating an embedding pattern used for solving an Integer Linear Programming problem using a Physical Ising Machine, EP-3664099-A1 provides a method for solving an exchange problem, whereas U.S. Pat. No. 9,152,746-B2 provides a quantum annealer simulator for solving optimization problems.

Tensor networks aid in the solving of many computing problems since they enable alternative representations of the problems. Such alternative representations can be digitally processed, thereby changing the way the problem is to be solved. Hence, a tensor network might ease finding a solution to the concerned problem.

There is an interest in having methods and devices that make possible to solve combinatorial optimization problems in an effective manner and in short timeframes, both of which are drivers for the control of processes, apparatuses and systems.

SUMMARY

A first aspect of the disclosure relates to a computer-implemented method comprising:

providing an equation with a cost function for minimization related to an optimization problem thereby yielding a cost function equation, the cost function equation including a plurality of discrete variables, i.e. variables that can only take a limited number of values;

converting the cost function equation with the plurality of discrete variables into an Unconstrained Optimization—i.e. UO—problem;

providing a Tensor Network—i.e. TN—with tensors such that the TN covers all possible configurations of variables of the UO problem;

providing a set of parameters and modifying coefficients of each tensor of the TN at least once for the provided set of parameters and such that, when modifying the coefficients of any tensor, a value of the cost function of the UO problem is reduced, the set of parameters relating to at least one parameter modifying the TN and/or at least one parameter that influences the modification of coefficients;

repeating the modifying step for the provided set of parameters until first one or more predetermined criteria are met, the first one or more predetermined criteria relating to the value of the cost function of the UO problem and/or a number of times that the modifying step has been conducted for the provided set of parameters;

storing at least the value of the cost function associated with the provided set of parameters every time the first one or more predetermined criteria are met;

repeating the providing the set of parameters and modifying steps one or more times, each time providing a different set of parameters so as to allow further reduction in the value of the cost function;

when the coefficients of the tensors have been modified for at least two provided sets of parameters and every time the first one or more predetermined criteria are met, checking whether the value of the cost function last stored meets a second predetermined criterion, the second predetermined criterion relating to a convergence reached in the value of the cost function based on one or more other values of the cost function stored;

every time the second predetermined has not been met in the checking step:
  repeating the providing the set of parameters and modifying steps with a different set of parameters thereby allowing further reduction in the value of the cost function, the different set of parameters relating to at least one parameter modifying the TN and/or at least one parameter that influences the modification of coefficients; and/or
  changing the first one or more predetermined criteria and repeating the modifying step for the provided set of parameters; and when the second predetermined criterion has been met in the checking step, solving the UO problem using the TN and providing respective values of the plurality of discrete variables of the cost equation.

The method solves the UO problem featuring the cost function to be optimized using a tensor network. This, in turn, makes possible to improve a process, apparatus or system having an operation or dynamics characterized by such cost function, either by automatically controlling the process, apparatus or system, or by providing the information to an operator for making the adjustments manually. In this sense, the optimization problem preferably relates to the operation of apparatuses and/or systems, and/or relates to processes themselves, e.g. how the different entities in a process interact. For example, the optimization problem may relate to an optimization problem for one of: control of a factory, control of a production line, control of a machine, training of a machine learning algorithm, factoring large numbers, control of logistics, control of scheduling, routing, portfolio optimization, financial equilibrium, quality control of workpieces produced with a machine, traffic flow, etc.

A computing device or system carrying out the method provides the cost function equation and processes it to provide the TN that will be used in an iterative process intended to optimize the value of the cost function. All possible configurations of the variables are present in the TN provided since it is not known in advance which configuration provides a better result than another, or which configuration optimizes the most. As it is known in the art, the tensors of a TN are interconnected by ancillary indices that take into account the structure and amount of correlations in the configurational state.

The cost function equation defines the UO problem, the minimization of which is typically an NP-Hard problem. When all the discrete variables are binary, the UO problem is an Unconstrained Binary Optimization—i.e. UBO—problem, and when the discrete variables are multilevel, i.e. the variables can take more than two different values, the UO problem is an Unconstrained General Optimization—i.e. UGO—problem.

The computing device or system forces the reduction in the value of the cost function of the UO problem by first providing a set of parameters relating to the TN and/or relating to parameters that influence tensor coefficients' modifications. With the provided set of parameters, the device or system takes each tensor and modifies the coefficients thereof reducing the value of the cost function, thus it does not leave any tensor of the TN with coefficients unmodified. The modification of coefficients takes place until all tensors have been updated in this manner at least once, and whilst the first one or more predetermined criteria are not met for the provided set of parameters; these one or more predetermined criteria can be whether a predetermined number of iterations of coefficients' modification have been conducted, and/or whether one or more parameters related to the value of the cost function have attained a predetermined level of convergence. By way of example, said one or more parameters can be the value itself, its derivatives, and analytic functions of the value and its derivatives. That is to say, in some embodiments, a criterion or criteria can be whether one or more parameters related to the tensor network have attained a predetermined level of convergence. By way of example, said one or more parameters can be the singular values of specific tensor bipartitions, their derivatives, and analytic functions of such singular values and their derivatives.

The computing device or system repeats the aforesaid process one or more times but each time with a different set of parameters so that the value of the cost function can be further reduced. The resulting value of the cost function for each of set of parameters is stored when the first one or more predetermined criteria are met, in this way the computing device or system will assess whether sufficient optimization has been achieved in the UO problem. In this sense, when at least two values have been stored, the computing device or system takes the last stored value and checks whether it meets a second predetermined criterion which is indicative of the degree of convergence attained by the solution to the UO problem so far, i.e. whether the value of the cost function has converged to a sufficient extent according to a predetermined threshold or set of thresholds. Based on this assessment, the coefficients of the tensors are to be modified once again or, alternatively, it is deemed that said solution optimizes the cost function sufficiently. Regarding the former, before iterating over some or all tensors once again, the computing device or system first provides another set of parameters, and/or changes the first one or more predetermined criteria; with said provision and/or change, the computing device or system attempts to arrive at a better solution when modifying the coefficients of the tensors.

Parameters of the TN that can be part of the set of parameters are, for example but without limitation: a bond dimension of the TN, a unit cell of the TN, etc.; parameters that configure the modification of the coefficients that can be part of the set of parameters are, for example but without limitation: a Trotter-step in imaginary-time evolution, an error tolerance in algebra functions used for modifying the coefficients, a number of times that each tensor must have its coefficients modified, etc. Likewise, the first one or more predetermined criteria can be modified so as to change the predetermined number of iterations of coefficients' modification, the predetermined level of convergence of the one or more parameters, etc. A combination of any one of these parameters or criteria is possible to further reduce the value of the cost function.

When the first and second predetermined criteria are met, the computing device or system determines that the solution optimizes the problem to a certain degree. A trade-off between execution or running time of the method and the level of optimization is to be set for the solution to be provided in a timeframe adequate with the problem and concerned process, apparatus or system. The values of the discrete variables are provided so that an operator is able to adjust the concerned process, apparatus or system, or they may be directly inputted in a device controlling the same so as to automatically adjust the concerned process, apparatus or system.

In some embodiments, the method further comprises providing at least one command to or actuating an apparatus or system for configuration thereof, the at least one command or actuation being based on the provided respective values of the plurality of discrete variables.

The apparatus or system, or a process in which said apparatus or system is involved, has an operation or evolution characterizable by the optimization problem. Upon finding the solution to the optimization problem, the operation of the apparatus or system or the evolution of the process can be adjusted by commanding or actuating said apparatus or system in accordance with the values of the variables, thereby enhancing the operation or the process and attaining one or more of e.g. reduction in energy consumption, reduction in operational costs, reduction in noise, increase in production quantities, increase in quality of produced goods, among other.

It is also possible to provide the apparatus, system or process with closed-loop feedback, in this way after actuating or issuing the at least one command, a new optimization problem can be obtained or the same optimization problem maintained but with more recent data of the apparatus, system or process—e.g. sensor data, information introduced by users indicative of the operation, etc. —, and optimize the associated cost function to monitor the correct performance or perform subsequent actuation or issuance of commands. In this case, the method comprises repeating all the steps with the new or updated cost function. Therefore, the actuation or issuance of at least one command improves the respective operation or evolution.

In some cases, the apparatus, system or process can be part of a design or simulation procedure whereby the entity or process designed or simulated is influenced by the optimization problem. That is to say, the optimization problem may reflect the designing or simulating of the entity or process. Accordingly, the actuation or the at least one command based on the discrete variables alter the entity or process under design or simulation and improve the result thereof.

In some embodiments, the TN provided includes constraints of the one, some or all discrete variables of the plurality of discrete variables, the constraints being included as local or global symmetries in the tensors of the TN.

In some embodiments, the first set of parameters provided is a predetermined set of parameters, that is to say, the step of providing the set of parameters comprises retrieving the predetermined set of parameters from a memory of the computing device or system or a server communicatively coupled with the computing device or system. In some of these embodiments, the step of providing the set of parameters further comprises assessing one or both of the TN provided and the cost function of the UO problem, and selecting the predetermined set of parameters to be retrieved based on the assessment. In some embodiments, each set of parameters provided is a predetermined set of parameters.

The set of parameters is provided so as to enable the reduction in the value of the cost function, and a same predetermined set of parameters might be used in the first loop of coefficients' modification or be based on the characteristics of the TN and/or the UO problem. Likewise, the sets of parameters for subsequent loops of coefficients' modifications can be automatically provided by the computing device or system based on said characteristics.

In some embodiments, the step of providing the set of parameters comprises receiving the set of parameters via user input means. When a set of parameters is to be provided by the user, it is preferably the first set of parameters. Sets of parameters of loops subsequent to the first loop might also be provided by the user or by the computing device or system in the manner explained above.

In some embodiments, the step of providing the equation with the cost function further comprises defining the cost equation upon processing data relative of an apparatus, system or process related to the optimization problem.

The cost function can be defined on-the-fly based on data provided by the apparatus, system or process, in this way the optimization in the configuration thereof can be dynamically set or adjusted, thereby improving the operation or evolution of the apparatus, system or process.

In some embodiments, the plurality of discrete variables relates to one or more devices of the apparatus or system, and wherein the at least one command is provided to or the actuation is made on one of the following: at least one device of said one or more devices, at least one device different from said one or more devices, and a combination thereof.

When the command is provided to or the actuation is made on at least one device different from said one or more devices, said at least one device is involved in a process in which the one or more devices are involved.

For instance, the result in the process of the at least one device is to be processed by the one or more devices. By way of example, in a production line, the values of the variables may reveal that workpieces being processed by the one or more devices have been incorrectly processed in an earlier stage—including said at least one device different from the one or more devices—and, thus, the earlier stage needs to be adjusted. By way of another example, the values of the variables might be indicative of the flow of traffic in a freeway at a certain mile marker and show a flow of traffic that entails risk of accident—e.g. due to speeds or short spacing between motor vehicles—or excessive emission of particles—e.g. due to the speeds—, and sets of cameras and configurable digital traffic signs at said mile marker or at preceding mile markers can be adjusted to reduce the maximum speeds or change the allowed driving lanes. By way of another example, the values of the variables can reflect the electrical loads of customers assigned to different phases of a distribution feeder, and the optimization might show that a different distribution of the electrical loads reduce the losses.

In some embodiments, the coefficients of several tensors are simultaneously modified. Modifying more than one tensor simultaneously can also be convenient to reduce the likelihood of local minima.

Moreover, in embodiments that involve the introduction of constraints in the Unconstrained Optimization problem, such constraints (such as equalities and inequalities for functions of the optimization variables) can be either introduced in the cost function via Lagrange multipliers, or included as global or local symmetries in the tensors of the TN via block-diagonal tensors, this last option implying that the optimization process is only carried out in the relevant configurational space, which increases efficiency and accuracy.

In some embodiments, the coefficients of one, some or all tensors are modified at least twice for the provided set of parameters.

A better solution can be expected for each modification of coefficients that the tensors are subjected to. Modifying coefficients of a tensor at least twice for a same set of parameters can be convenient for reducing the likelihood of the cost function of the UO problem reaching local minima.

In some embodiments, the modifying step comprises: selecting a tensor of the TN that, for the provided set of parameters, either has not been previously selected for modification of coefficients or has been previously selected for modification of coefficients equal or fewer times than any other tensor of the TN, modifying the coefficients of the selected tensor such that the tensor with modified coefficients reduces the value of the cost function of the UO problem, preferably up to numerical error, and repeating these steps for each tensor of the TN at least once.

In some embodiments, if the overall precision is not sufficiently high, modifying the value of the selected tensor in the TN can result in a higher value of the cost function, instead of a lower value, with a deviation of the order of numerical error due to low precision. In such embodiments, a higher overall precision may be required, depending on the overall error tolerance allowed. This can be achieved by the precision parameters, and/or the TN, and/or the optimization strategies.

The computing device or system takes all tensors one-by-one and modifies the coefficients thereof to reduce the value of the cost function, and does so by sequentially selecting the tensor for modification of the coefficients thereof. The tensor can be selected in any way, even at random, but should be such that a tensor can be selected only if it has had its coefficients modified as many times as the other tensors, or fewer times than the other tensors. Aside from this, the tensors can be selected following a sequential order of the tensor network, selected at random, or in another way. Accordingly, by way of example, if there are N tensors, after N iterations all tensors will have their respective coefficients modified once, after 1.5 times N iterations half the tensors will have their respective coefficients modified twice and the other half of the tensors will have their respective coefficients modified once, or after 2 times N iterations all tensors will have their respective coefficients modified twice.

In some embodiments, modifying the coefficients comprises providing the tensor to at least one quantum processor and/or to at least one classical processor, and receiving the tensor with modified coefficients from the at least one quantum processor and/or the at least one classical processor, the at least one quantum processor using quantum linear algebra and the at least one classical processor using classical linear algebra.

The coefficients can be modified by means of quantum processor(s) and/or classical processor(s), each using respective linear algebra functions for effecting the modification of coefficients.

Classical processors, i.e. processors that are non-quantum, can take the form a central processing unit—CPU—, a graphics processing unit—GPU—, a field-programmable gate array—FPGA—, or a combination thereof. When a plurality of classical processors is used, they can be configured to perform distributed processing, and preferably are arranged so as to form a high-performance computing network or cluster for processing the tensors more rapidly. The classical processor(s) runs classical linear algebra functions such as one or more of: singular value decomposition—SVD—, exact diagonalization—ED—, principal component analysis—PCA—, matrix multiplication—MM—, etc.

Quantum processors, or QPUs, can take the form of superconducting circuits, photonic circuits, ion-trap circuits, neutral atom circuits, etc. When a plurality of such processors is used, they likewise might be arranged as forming a cluster of QPUs for distributing the solving of a computing task between several processors of this type so that they compute threads thereof in parallel. Typically, QPUs are capable of conducting linear algebra operations, in this case quantum linear algebra operations, faster than classical processors, and even more so when large objects are being evaluated. In fact, classical processors usually struggle significantly with these operations whenever a computing problem has to be solved. QPU(s) runs quantum linear algebra functions such as one or more of: quantum SVD, quantum ED, quantum PCA, quantum MM, etc.

Current QPUs, consisting of Noisy Intermediate-Scale Quantum (NISQ) devices, are of limited capability so that it is difficult to cast in them the whole UO optimization problem, but they are however of sufficient capability to handle the individual sub-problems related to the optimization of each individual tensor in a TN.

In some of these embodiments, both the at least one quantum processor and the at least one classical processor are used, that is to say, modifying the coefficients comprises providing the tensor to both the at least one quantum processor and the at least one classical processor and receiving the tensor with modified coefficients from both.

The combination of the processing capabilities of both quantum and classical processors improves the overall performance of the method compared to when only processed with classical processors.

On the one hand, a purely classical method would use linear algebra subroutines for tasks such as SVD, MM, and more. The computational cost of solving these problems on classical hardware depends on factors such as the specific library used, the computer language used, the classical processor used, but it is always a polynomial in the size of the matrix input. On the other hand, using a quantum processor to compute SVD, MM, and more, allows to use quantum algorithms for these tasks, with the algorithms having a lower computational cost, polynomial in the logarithm of the size of the matrix input. Notwithstanding, certain quantum processors feature some problems or limitations, e.g. limited memory, noise levels, etc., and thus it may not be possible to solve the whole UO problem only with quantum processors.

When the quantum processors used cannot cope with the entire task to be run, due to limited memory of the quantum processors for example, part of the modification of coefficients is run by the quantum processor(s), preferably the part requiring more linear algebra operations, and the other part is run by the classical processor(s). The quantum processor(s) would therefore increase both the efficiency and the accuracy of the overall method than if just using classical processor(s).

In some embodiments, modifying the coefficients can comprise using one of the following optimization strategies: variational optimization, imaginary-time evolution optimization, and tangent-space optimization.

Each of the optimization strategies has its own benefits. Variational optimization is good for non-homogeneous systems, and certifies that the final solution is a minimum of the cost function. Imaginary-time evolution is simple to implement for quadratic interactions involving neighbors on a lattice. Tangent space methods are extremely fast and are easy to implement in homogeneous systems.

The use of a specific optimization strategy might lead to a better solution to the UO problem since the coefficients of the tensors are modified differently, or achieve a same solution in less time than with other optimization strategy. Hence, depending on the characteristics of the UO problem, one optimization strategy is usually preferred over others.

One or another optimization strategy might be selected by a user, in which case the case modifying step further comprises receiving the optimization strategy via user input means, or by the computing device or system running the method, in which case the modifying step further comprises receiving the optimization strategy from a memory of the computing device or system or a server communicatively coupled with the computing device or system.

Regarding the latter, the computing device or system can select the optimization strategy following an evaluation of the UO problem and the cost function thereof, so each optimization strategy preferably has one or several parameters associated therewith that the computing device or system checks for determining which optimization strategy it selects.

In some embodiments, a structure of the TN provided can be one of: Matrix Product States, Projected Entangled Pair States, Multi-Scale Entanglement Renormalization Ansatz, and Tree Tensor Network.

The structure of the TN defines the correlation between the different variables and, thus, alters the representation of the TN. Sometimes, a certain structure might lead to a better solution to the UO problem since the coefficients of the tensors are modified differently, or achieve a same solution in less time than with other structure. A TN structure can be preferred over others for said reason.

The structure of the TN can be chosen either by the user or by the computing device or system running the method itself. If chosen by the computing device or system, the algorithm evaluates the topology of interactions of the variables in the UO problem, and looks for the TN that better adapts to such structure. If the TN is too complex so that the manipulation of tensors is computationally costly, the algorithm can decide to use a sub-optimal TN, so that computational cost in tensor manipulations is reduced, at the cost of having to increase the number of iterations to achieve a desired accuracy.

When the TN structure is selected by a user, the providing the TN step comprises receiving the structure via user input means, and when it is selected by the computing device or system running the method, the providing the TN step comprises receiving the structure from a memory of the computing device or system or a server communicatively coupled with the computing device or system. As aforesaid, selection of the structure by the computing device or system can be based on an evaluation of the UO problem and the cost function thereof.

As aforesaid, in embodiments such that the UO problem is provided together with constraints on the cost function variables (such as equalities and inequalities), the TN can be chosen to be formed by block-diagonal tensors, with such block-diagonal tensors imposing the constraints of the variables as local and/or global symmetries in the tensors of the TN, so that the constraints are directly implemented in the solution ansatz.

In some embodiments, the providing the equation step further comprises: if any variable of the cost function is continuous, converting each continuous variable of the cost function into a respective discrete variable of the cost function equation.

The method makes possible to solve optimization problems in which there are continuous variables. In these embodiments, all the continuous variables are discretized. Then, after solving the problem, the values of the continuous variables can be estimated so that they are not limited to the quantization levels used in the digitization of the variables. In this way, the result of the optimization becomes more precise.

The discretization of variables is preferably made with the following equation: $p = \Sigma_{\alpha=0}^{m-1} K^{\alpha} x_{s,\alpha}$, where p is the respective continuous variable, m is the respective number of discrete variables for the digitization, $x_{s,\alpha}$ is the respective discrete variable, and K is the respective number of quantization levels; by way of example, K is 2 for binary variables.

In some embodiments, the converting step further comprises, if any term of the cost equation function is non-polynomial, converting in the cost equation function each non-polynomial term into a polynomial term by approximation of the non-polynomial term.

The conversion simplifies solving the UO problem since the linear algebra functions are then to be applied in respect of polynomial terms rather than non-polynomial terms, and only when there is one or more non-polynomial terms, which is not always the case.

A second aspect of the disclosure relates to a data processing device—or data processing system—comprising means for carrying out the steps of a method according to the first aspect of the disclosure.

In some embodiments, the data processing device—or the data processing system—further comprises at least one quantum processor for modifying the coefficients of the tensors of the TN, or at least one classical processor for modifying the coefficients of the tensors of the TN, or both.

A third aspect of the disclosure relates to a device comprising: at least one processor, and at least one memory comprising computer program code for one or more programs; the at least one processor, the at least one memory, and the computer program code configured to cause the device to at least carry out the steps of a method according to the first aspect of the disclosure, i.e.: provide an equation with a cost function for minimization related to an optimization problem thereby yielding a cost function equation, the cost function equation including a plurality of discrete variables; convert the cost function equation with the plurality of discrete variables into an Unconstrained Optimization, UO, problem; provide a Tensor Network, TN, with tensors such that the TN covers all possible configurations of variables of the UO problem; provide a set of parameters and modify coefficients of each tensor of the TN at least once for the provided set of parameters and such that, when modifying the coefficients of any tensor, a value of the cost function of the UO problem is reduced, the set of parameters relating to at least one parameter modifying the TN and/or at least one parameter that influences the modification of coefficients; repeat the modification of coefficients for the provided set of parameters until first one or more predetermined criteria are met, the first one or more predetermined criteria relating to the value of the cost function of the UO problem and/or a number of times that the modification of coefficients has been conducted for the provided set of parameters; store at least the value of the cost function associated with the provided set of parameters every time the first one or more predetermined criteria are met; repeat the provision of the set of parameters and modification of coefficients one or more times, each time providing a different set of parameters so as to allow further reduction in the value of the cost function; when the coefficients of the tensors have been modified for at least two provided sets of parameters and every time the first one or more predetermined criteria are met, check whether the value of the cost function last stored meets a second predetermined criterion, the second predetermined criterion relating to a convergence reached in the value of the cost function based on one or more other values of the cost function stored; every time the second predetermined has not been met in the check: repeat the provision of the set of parameters and modification of coefficients with a different set of parameters thereby allowing further reduction in the value of the cost function, the different set of parameters relating to at least one parameter modifying the TN and/or at least one parameter that influences the modification of coefficients, and/or change the first one or more predetermined criteria and repeating the modifying step for the provided set of parameters; and when the second predetermined criterion has been met in the check, solve the UO problem using the TN and provide respective values of the plurality of discrete variables of the cost equation.

In some embodiments, the at least one processor, the at least one memory, and the computer program code may also be configured to cause the device to carry out the steps of the different embodiments of the method described in the first aspect of the disclosure.

A fourth aspect of the disclosure relates to a computer program product comprising instructions which, when the program is executed by a computer, cause the computer to carry out the steps of a method according to the first aspect of the disclosure.

A fifth aspect of the disclosure relates to a non-transitory computer-readable medium encoded with instructions that, when executed by at least one processor or hardware, perform or make a device to perform the steps of a method according to the first aspect of the disclosure.

A sixth aspect of the disclosure relates to a computer-readable data carrier having stored thereon a computer program product according to the fourth aspect of the disclosure.

A seventh aspect of the disclosure relates to a data carrier signal carrying a computer program product according to the fourth aspect of the disclosure.

Similar advantages as those described with respect to the first aspect disclosure may also apply to the remaining aspects of the disclosure.

BRIEF DESCRIPTION OF THE DRAWINGS

To complete the description and in order to provide for a better understanding of the disclosure, a set of drawings is provided. Said drawings form an integral part of the description and illustrate embodiments, which should not be interpreted as restricting the scope of the disclosure, but just as examples of how the disclosed methods or entities can be carried out. The drawings comprise the following figures.

DETAILED DESCRIPTION OF THE DRAWINGS

Figure 1:
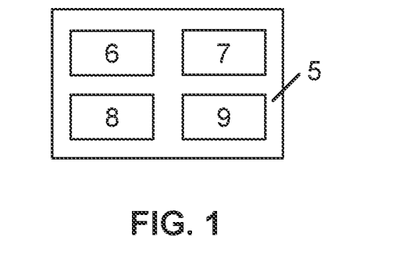
FIG. 1 diagrammatically shows a computing device in accordance with embodiments.

FIG. 1 diagrammatically shows a computing device 5 in accordance with embodiments.

Figure 2:
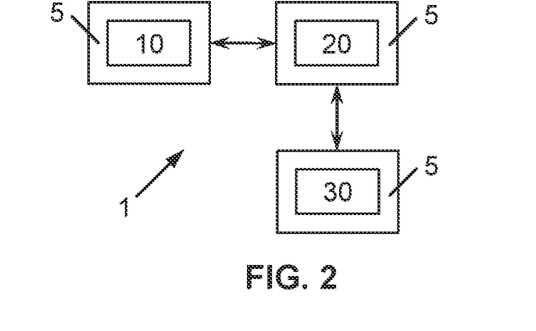
FIG. 2 diagrammatically shows a computing system in accordance with embodiments.

The computing device 5 can be part of a computing system, such as computing system 1 shown in FIG. 2 for instance. Methods according to the present disclosure can be carried out by the computing device 5 or by a computing system including one or more computing devices 5.

The computing device 5 comprises at least one classical processor 6 and at least one memory 7. The at least one memory 7 may include instructions, for example in the form of a computer program code, so that a method according to the present disclosure is carried out upon execution by the at least one classical processor 6.

The computing device 5 also comprises a communications module 8 at least in the embodiments in which it is communicatively coupled with other computing devices, and/or with apparatuses, systems or controlling devices operating the same or a process. The communications module 8 can be any known in the art for wired or wireless data communications.

In some embodiments, the computing device 5 further comprises at least one quantum processor 9 that updates tensors of a tensor network by modifying the coefficients thereof.

The computing device 5 may comprise or be part of: a computer processing unit, a graphics processing unit, or a field-programmable gate array.

FIG. 2 diagrammatically shows a computing system 1 in accordance with embodiments.

Computing systems 1 include one or more computing devices 5 communicatively coupled and one or more steps, or at least parts thereof, of a method are executed by one or more computing devices 5, and other parts or other one or more other steps of the method are executed by one or more other computing devices 5.

Each computing device 5 comprises one module 10, 20, 30 for performing certain tasks for operation of the computing system 1. Each module 10, 20, 30 is a processing module that comprises a computer program, and further comprises or is communicatively coupled with at least one processing unit and at least one memory unit for running the computer program as described with reference to FIG. 1.

In some examples, a computing device 5 is provided with a plurality of modules or all modules (as in FIG. 1). Likewise, in some examples, several computing devices 5 include a same module and may be configured to perform distributed computing between them, thereby computing the associated tasks in parallel.

The first module 10 is a module for providing a cost function related to an optimization problem, managing the solving thereof, and providing the solution. The second module 20 is a module for solving an Unconstrained Optimization problem provided by the first module 10. And the third module 30 is a module for modifying coefficients of tensors of a tensor network provided by the second module 20. For the sake of the clarity only, arrows have been illustrated showing the communication of data between the different modules 10, 20, 30. These modules 10, 20, 30 will be described in more detail with reference to FIGS. 4-6.

Figure 3:
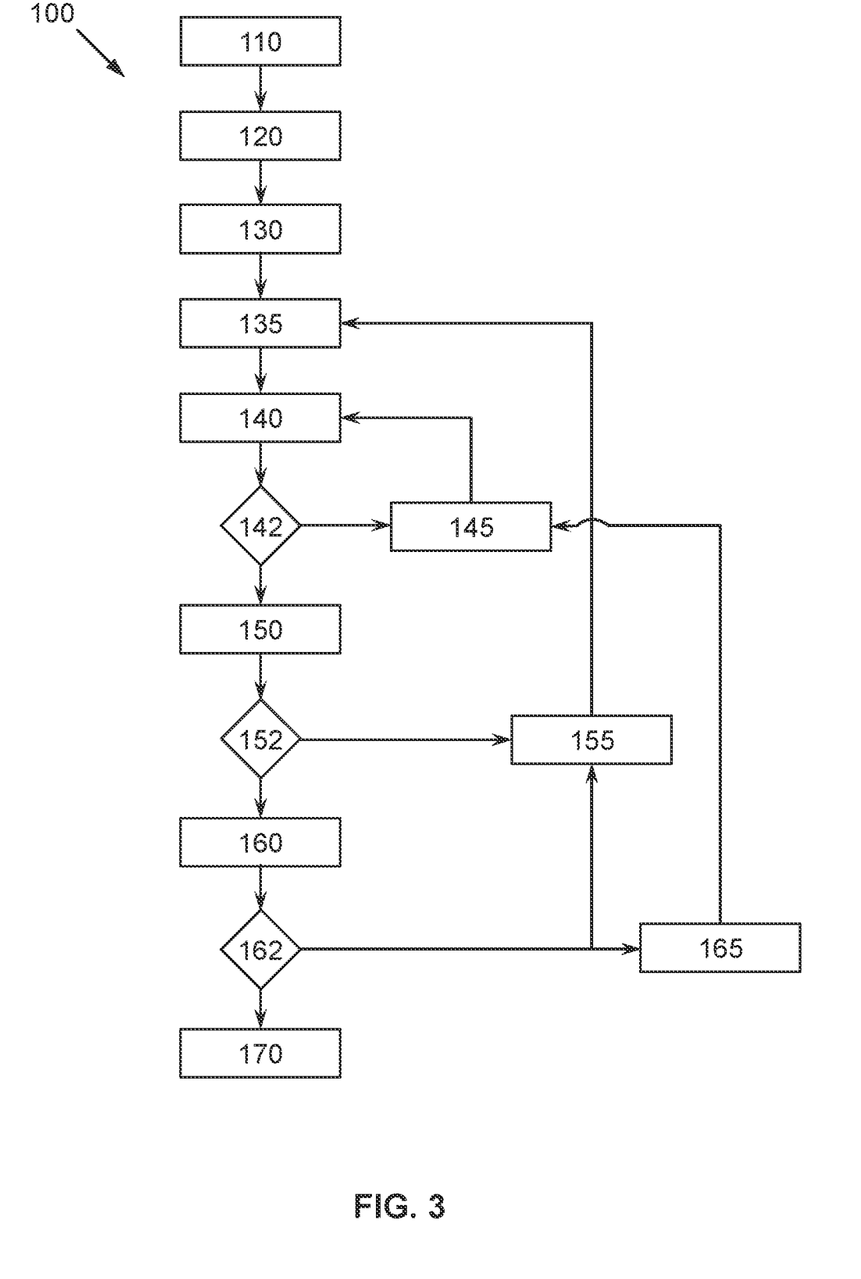
FIG. 3 diagrammatically shows a method in accordance with embodiments.

FIG. 3 diagrammatically shows a method 100 in accordance with embodiments.

The method 100 comprises a step whereby a computing device or system provides 110 an equation with a cost function, thereby defining a cost equation function. The cost function relates to an optimization problem that is to be minimized. The cost equation function includes a multiplicity of discrete variables. When the cost function includes continuous variables, they are digitized so as to make them discrete.

The cost function can be provided 110 by a user through user input means, e.g. a keyboard, a mouse, a touchscreen, a microphone, etc., that are connected to the computing device or system, or are connected to a different electronic device that is communicatively coupled with the computing device or system—e.g. via a wired or wireless connection—. Likewise, the cost function can be stored on a server or in a memory of the computing device or system and retrieved therefrom, or can be provided by an apparatus, system or controlling device thereof. In this sense, the optimization problem relates to the apparatus or system since the cost function characterizes operation or dynamics of the apparatus or system.

By way of example, when the cost function relates to a QUBO, the equation might be of the form:

$$H = \sum_{\langle i,j \rangle} Q_{ij} x_i x_j + \sum_i q_i x_i$$

where $x_i$ and $x_j$ are binary variables, and $Q_{ij}$ and $q_i$ are couplings of the respective binary variables $x_i$ and $x_j$.

By way of another example, when the cost function relates to a Higher-order UBO, the equation might be of the form:

$$H = \sum_{n, \langle i1, i2, \ldots, in \rangle} Q_{i1 i2 \ldots in} x_{i1} x_{i2} \ldots x_{in}$$

where $x_{i1}, x_{i2}, \ldots x_{in}$, are the binary variables, and $Q_{i1\ i2\ \ldots\ in}$ are couplings of the respective binary variables $x_{i1}, x_{i2}, \ldots, x_{in}$.

The method 100 comprises a step whereby the computing device or system converts 120 the cost function equation of the providing step 110, with the plurality of discrete variables, into a UO problem.

The method 100 comprises a step whereby the computing device or system provides 130 a TN with tensors. The TN is configured in such a way that it covers all possible configurations of variables of the UO problem provided in the converting step 120.

The method 100 comprises a step whereby the computing device or system providing 135 a set of parameters with at least one parameter being for modifying the TN (e.g. a bond dimension of the TN, a unit cell of the TN, etc.), and/or with at least one parameter for influencing the subsequent step of modifying 140 coefficients (e.g. a Trotter-step in imaginary-time evolution, an error tolerance in algebra functions used for modifying the coefficients, a number of times that each tensor must have its coefficients modified, etc.). A user or a computing device or system provides 135 the set of parameters.

The method 100 comprises a step whereby the computing device or system modifies 140, one or more times, coefficients of each tensor of the TN provided 130 for the set of parameters provided 135. The coefficients of the tensors are modified 140 such that the cost function of the UO problem decreases each time in order to achieve optimization.

The method 100 comprises a step whereby the computing device or system repeats 145 the modifying step 140 until first one or more predetermined criteria are met, thereby producing a loop. To this end, the computing device or system compares 142 the value of the cost function (or a parameter thereof) and/or a number of times that the coefficients' modifications 140 has been conducted with predetermined threshold(s) or range(s) so as to determine whether the modification 140 of coefficients of the tensors has resulted in a sufficient optimization. Regarding the former, the convergence can be established, for example, by computing a difference between the current value (or a parameter thereof) of the cost function and the value (or a parameter thereof) of the cost function before the most recent modification of coefficients of a tensor and comparing said difference with a predetermined threshold, or by computing a difference between the value (or the parameter thereof) of the cost function and the value (or the parameter thereof) of the cost function before having effected the N (with N equal to e.g. 50, 100, 500, etc.; with N equal to 1 the former example is provided) most recent modification of coefficients of tensors and comparing said difference with a predetermined threshold; when the difference does not exceed the predetermined threshold it is deemed that the value (or the parameter thereof) has converged sufficiently.

When the first one or more predetermined criteria are met, the repetition 145 of the modification 140 of coefficients is halted for the provided 135 set of parameters, and the value of the cost function is stored 150.

The computing device or system then checks 152 whether at least two loops of providing 135 a set of parameters and modifying 140 the coefficients of the tensors have taken place, if not, it proceeds to another step of the method 100 whereby the computing device or system repeats 155 said two steps 135, 140 but with a different set of parameters for further optimization. When the coefficients of the tensors have been modified 140 as explained above but for the newly provided 135 set of parameters and the first one or more predetermined criteria have been met in the corresponding comparison 142, the new value of the cost function is stored 150.

The method 100 comprises a step whereby, having at least two stored 150 values, the computing device or system checks 160 whether the value that has been last stored (i.e. that of the last loop run) meets a second predetermined criterion relating to a convergence reached in the value of the cost function. For that, the last stored 150 value is compared with the immediately previously stored 150 value or another previously stored 150 value to determine the convergence reached in the solution after having conducted two or more loops as described above. The convergence can be established by computing a difference between a given pair of stored 150 values including the last one stored, and comparing said difference with a threshold to determine if the reduction that has been attained in the last loop or loops is small.

When the second predetermined criterion has not been met 162 in the checking step 160, the method 100 proceeds to the repeating 155 step (in which case a new set of parameters is provided 135) and/or to a step whereby the computing device or system changes 165 the first one or more predetermined criteria, and then proceeds to the repeating 145 for the same set of parameters provided 135 in the last loop that took place.

When the second predetermined criterion has been met 162, the method 100 proceeds to a step thereof whereby the computing device or system solves 170 the UO problem using the TN and provides respective values of the plurality of discrete variables of the cost equation.

At this point, the values that achieve a reduction in the value of the cost function of the UO problem are known. An operator can manually adjust an apparatus, system or controlling device giving rise to the cost function and, thus, the UO problem, or let the computing device or system to automatically do so by providing the values with the communications module.

Figure 4:
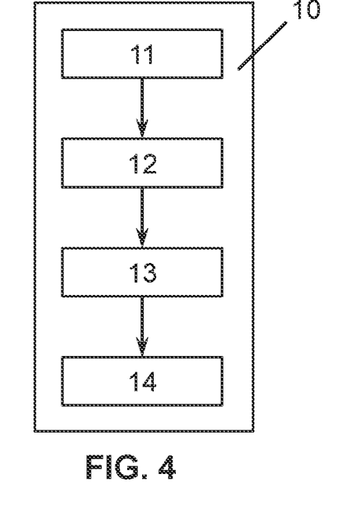
FIGS. 4-6 diagrammatically show operation of modules of computing devices in accordance with embodiments.

FIG. 4 diagrammatically shows operation of a first module 10 of computing devices in accordance with embodiments.

The first module 10 provides 11 the cost function to be optimized together with the variables thereof. The cost function can be defined by the first module 10 upon receiving data associated with the optimization problem, e.g. sensor data, information introduced by users relative to an apparatus, system, or process, etc. Alternatively, as aforesaid, the cost function can be provided by a user, the apparatus, or the system, or be previously stored in the computing device or a server. The provision 11 of the cost function includes converting any continuous variables into discrete variables.

The first module 10 provides 12 the UO problem based on the cost function provided 11. Depending on the type of cost function, the UO problem provided 12 is a UBO problem—e.g. a Quadratic UBO, a Higher-order UBO—or a UGO problem.

The first module 10 then goes on to solving 13 the UO problem. For solving the problem, the first module 10 preferably at least partially relies on a second module 20 intended to solve the problem. The first module 10 communicates the UO problem to the second module 20, and once the output is provided by the latter, the first module 10 processes it. In some cases, the second module 20 is also part of the same computing device thus no communication between different computing devices is necessary.

With the processed output, the first module 10 provides 14 a solution to the UO problem by either communicating the values of the variables of the cost function, namely the configuration that attained the reduction or optimization of the UO problem, or inputting said configuration to an apparatus, system or controlling device featuring said UO problem in order to optimize the operation thereof.

Figure 5:
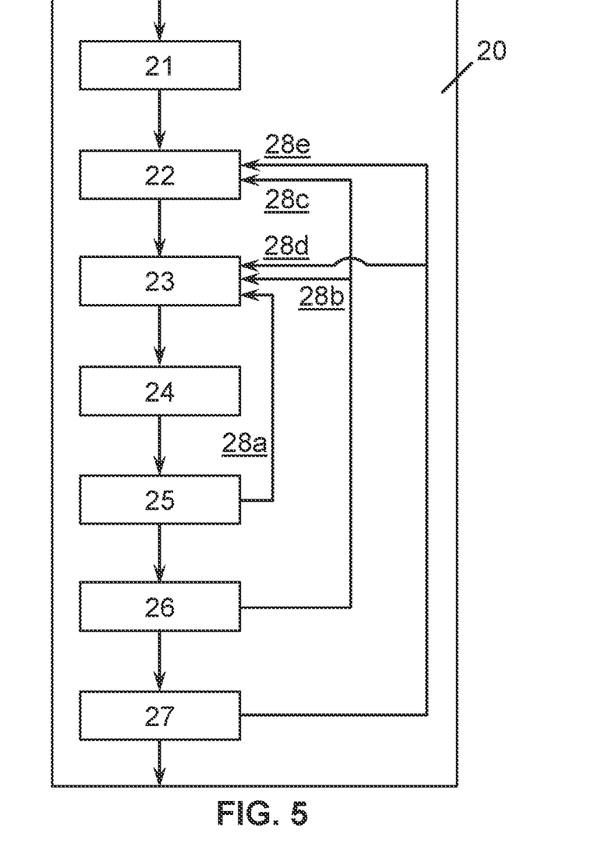

FIG. 5 diagrammatically shows operation of a second module 20 of computing devices in accordance with embodiments.

The second module 20 receives a UO problem from the first module 10 and sets up 21 a TN in accordance with the received UO problem. The resulting TN features a structure and an optimization strategy based on the UO problem or based on user input.

Once the TN is set up 21, the second module 20 provides 22 a set of parameters that modify the TN and/or influence the subsequent modification of coefficients. Then, the second module 20 selects 23 a tensor, e.g. tensor i=1, so as to modify 24 the coefficients of the tensor. For the modification 24 of coefficients, the second module 20 preferably at least partially relies on a third module 30 intended to use linear algebra functions on the tensors to modify the coefficients according to the optimization strategy and with the aim of reducing the value of the UO problem. The third module 30 sends the tensor with modified coefficients to the second module 20.

After the modification 24, the second module 20 checks 25 if all the tensors of the TN have had their coefficients modified so as to meet predetermined sweep criteria. If the predetermined sweep criteria are not met, the second module 20 goes back 28a to select 23 a tensor among all tensors, e.g. tensor i=2, and its coefficients are modified 24. The modification 24 of coefficients, check 25 and selection 23 of another tensor are looped 28a until the predetermined criteria are met.

The predetermined sweep criteria relate to the number of times that the tensors have been modified, thus it sets how many times the tensors must have their coefficients modified 24; the number of times does not necessarily have to be equal for all tensors, but they all have to be modified at least once.

Afterwards, the second module 20 checks 26 if first one or more predetermined criteria are met, for example whether the TN meets one or more criteria, such as whether the total number of coefficients' modification 24 exceeds a predetermined value. The first one or more predetermined criteria may additionally or alternatively relate to the UO problem itself, for example whether one or more parameters related to the value of the cost function have achieved a predetermined convergence. If the first one or more predetermined criteria are not met, the second module 20 forces 28b further tensor selection(s) 23 for further coefficients' modifications 24 until the first one or more predetermined criteria are met.

When the first one or more predetermined criteria are met, the second module 20 stores the value of the cost function and checks 27 whether a second predetermined criterion is met, which is whether the value of the cost function of the UO problem has attained a predetermined convergence, something that can be checked 27 when at least two loops 28c of modifying 24 the tensors have been effected with different sets of parameters provided 22 in each loop 28c, that is to say, the procedure starting from the provision 22 of a set of parameters must be repeated at least once (but can be repeated twice, thrice or even more times) and each time meeting the first one or more predetermined criteria and storing the value of the cost function. If not, then the second module 20 forces 28d additional looping of the tensor selection 23, modification 24 and checks 25, 26 but changing the first one or more predetermined criteria, and/or it forces 28e additional looping of the provision 22 of a set of parameters, tensor selection 23, modification 24 and checks 25, 26.

When the cost function meets the second predetermined criterion, a solution can be outputted, which will be received by the first module 10.

Figure 6:
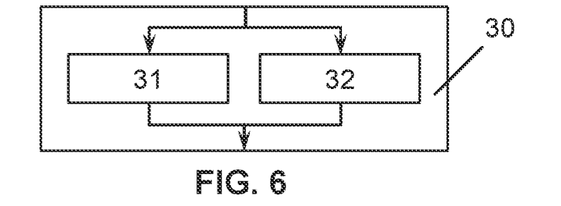

FIG. 6 diagrammatically shows operation of a third module 30 of computing devices in accordance with embodiments.

The third module 30 receives the TN and the cost function of the UO problem from the second module 20.

The third module 30 includes at least one quantum processor 31, or at least one classical processor 32, or both processors 31, 32.

The received data is provided to each processor 31, 32 of the third module 30, which in turn modifies the coefficients of the selected tensor to reduce the cost function. When more than one processor 31, 32 is provided within the third module 30, or when multiple third modules 30 or computing devices are to modify coefficients of the tensors, said modification is preferably performed with distributed processing, and more preferably with high-performance computing, thereby reducing the time the second module 20 has to wait for the updated tensor. The output of the third module 30 is provided to the second module 20. When multiple processors 31, 32 are arranged, irrespective of the nature thereof (i.e. quantum or classical), the third module 30 preferably processes the solutions provided by each processor 31 in order to produce the tensor with modified coefficients, which in turn is provided to the second module 20. Notwithstanding, the second module 20 may likewise perform such task in some embodiments.

The at least one quantum processor 31 runs quantum linear algebra functions such as one or more of: quantum SVD, quantum ED, quantum PCA, quantum MM, etc. The at least one classical processor 32 runs classical linear algebra functions such as one or more of: SVD, ED, PCA, MM, etc.

It is noted that when quantum processors 31 are present in the third module 30 and the quantum processors 31 are not based on electrical signals, one or more converters are provided, either within the third module 30, the second module 20 or between the second and third modules 20, 30. The converter(s) transform electrical signals into the physical medium used by the at least one quantum processor 31 and vice versa. By way of example, in some embodiments one or more quantum processors 31 are photonics quantum processors or devices adapted to conduct Gaussian Boson Sampling; in such embodiments, the electrical signals are converted into light, the light is inputted to the quantum processor(s) 31, and the resulting light output is converted into electrical signals.

Figure 7:
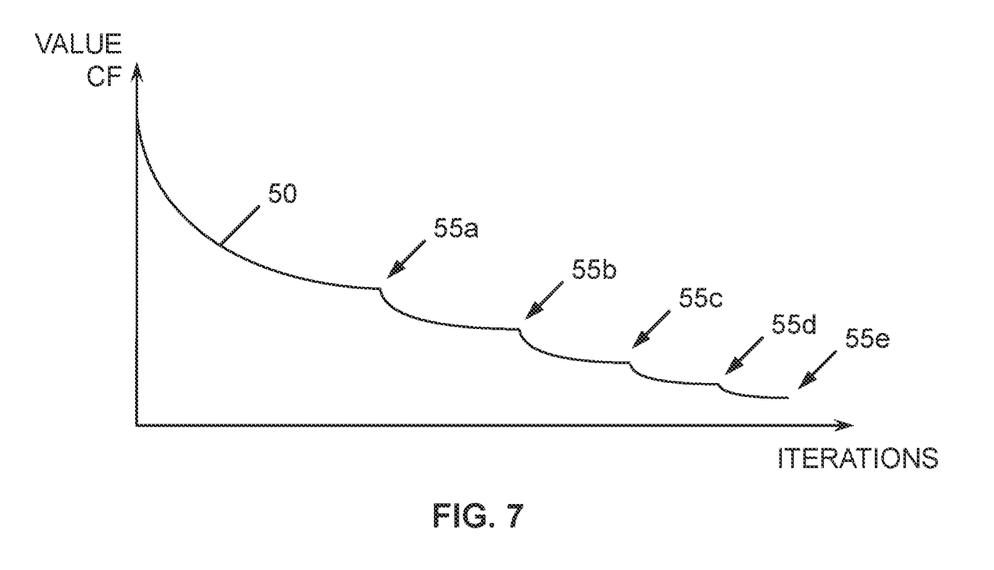
FIG. 7 shows a graph with the optimization of a UO problem with methods, devices and systems in accordance with embodiments.

FIG. 7 shows a graph with the optimization of a UO problem with methods, devices and systems in accordance with embodiments.

The graph represents the value 50 of the cost function of a UO problem versus iterations of modifying coefficients of the tensor network provided for solving the UO problem. Since the modification of coefficients is effected forcing the reduction in the value of the cost function, a curve with the value 50 is always decreasing.

A number of plateaus 55a-55e are illustrated showing the convergence attained when modifying the coefficients of the tensors for each set of parameters provided for solving the UO problem. The sets of parameters limit how much the tensor network can reduce the cost function, notwithstanding by sequentially providing different sets of parameters the optimization in the UO problem can be effected in a shorter time span. This is so because modifying the coefficients of the tensors with a set of parameters corresponding to that of the last plateaus is more complex due to the precision of the parameters and/or the number of parameters present in the set, yet the modification becomes simpler by using the coefficients found with simpler sets of parameters.

By way of example, a second predetermined criterion can be a predetermined threshold defining the maximum difference that can be accepted between the last plateau 55e, and the former plateau 55d, or a previous plateau such as plateau 55c, 55b.

In this text, the term "comprises" and its derivations—such as "comprising", etc.—should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art—for example, as regards the choice of materials, dimensions, components, configuration, etc.—, within the general scope of the disclosure as defined in the claims.

The invention claimed is:

1. A computer-implemented method, the method including the following steps:
    providing an equation with a cost function for minimization related to an optimization problem thereby yielding a cost function equation, the cost function equation including a plurality of discrete variables;
    converting the cost function equation with the plurality of discrete variables into an Unconstrained Optimization, UO, problem;
    providing a Tensor Network, TN, with tensors such that the TN covers all possible configurations of variables of the UO problem;
    providing a set of parameters and modifying coefficients of each tensor of the TN at least once for the provided set of parameters and such that, when modifying the coefficients of any tensor, a value of the cost function of the UO problem is reduced, the set of parameters relating to at least one of: at least one parameter modifying the TN, and at least one parameter that influences the modification of coefficients;
    repeating the modifying step for the provided set of parameters until first one or more predetermined criteria are met, the first one or more predetermined criteria relating to at least one of: the value of the cost function of the UO problem, and a number of times that the modifying step has been conducted for the provided set of parameters;
    storing at least the value of the cost function associated with the provided set of parameters every time the first one or more predetermined criteria are met;
    repeating the providing the set of parameters and modifying steps one or more times, each time providing a different set of parameters so as to allow further reduction in the value of the cost function;
    when the coefficients of the tensors have been modified for at least two provided sets of parameters and every time the first one or more predetermined criteria are met, checking whether the value of the cost function last stored meets a second predetermined criterion, the second predetermined criterion relating to a convergence reached in the value of the cost function based on one or more other values of the cost function stored;
    every time the second predetermined has not been met in the checking step, at least one of:
    repeating the providing the set of parameters and modifying steps with a different set of parameters thereby allowing further reduction in the value of the cost function, the different set of parameters relating to at least one of: at least one parameter modifying the TN, and at least one parameter that influences the modification of coefficients; and
    changing the first one or more predetermined criteria and repeating the modifying step for the provided set of parameters;
    when the second predetermined criterion has been met in the checking step, solving the UO problem using the TN and providing respective values of the plurality of discrete variables of the cost equation.

2. The computer-implemented method of claim 1, further comprising the step of: providing at least one command to or actuating an apparatus or system for configuration thereof, the at least one command or actuation being based on the provided respective values of the plurality of discrete variables.

3. The computer-implemented method of claim 2, wherein the plurality of discrete variables relates to one or more devices of the apparatus or system, and wherein the at least one command is provided to or the actuation is made on one of the following: at least one device of said one or more devices, at least one device different from said one or more devices, and a combination thereof.

4. The computer-implemented method of claim 1, wherein the TN provided includes constraints of the one, some or all discrete variables of the plurality of discrete variables, the constraints being included as local or global symmetries in the tensors of the TN.

5. The computer-implemented method of claim 1, wherein the modifying step comprises: selecting a tensor of the TN that, for the provided set of parameters, either has not been previously selected for modification of coefficients or has been previously selected for modification of coefficients equal or fewer times than any other tensor of the TN, modifying the coefficients of the selected tensor such that the tensor with modified coefficients reduces the value of the cost function of the UO problem, and repeating these steps for each tensor of the TN at least once.

6. The computer-implemented method of claim 1, wherein modifying the coefficients comprises providing the tensor to at least one of: at least one quantum processor and at least one classical processor; and receiving the tensor with modified coefficients from the at least one of the at least one quantum processor and the at least one classical processor, the at least one quantum processor using quantum linear algebra and the at least one classical processor using classical linear algebra.

7. The computer-implemented method of claim 6, wherein modifying the coefficients comprises providing the tensor at least to the at least one quantum processor and receiving the tensor with modified coefficients at least therefrom.

8. The computer-implemented method of claim 6, wherein modifying the coefficients comprises providing the tensor to both the at least one quantum processor and the at least one classical processor and receiving the tensor with modified coefficients from both.

9. The computer-implemented method of claim 1, wherein modifying the coefficients comprises using one of the following optimization strategies: variational optimization, imaginary-time evolution optimization, and tangent-space optimization.

10. The computer-implemented method of claim 1, wherein a structure of the TN provided is one of: Matrix Product States, Projected Entangled Pair States, Multi-Scale Entanglement Renormalization Ansatz, and Tree Tensor Network.

11. The computer-implemented method of claim 1, wherein the providing the TN step comprises: receiving a structure of the TN via user input means or from either a memory or server; and providing the TN such that the structure thereof is the received structure.

12. The computer-implemented method of claim 1, wherein the optimization problem relates to an optimization problem for one of: control of a factory, control of a production line, control of a machine, control of logistics, control of scheduling, routing, portfolio optimization, financial equilibrium, training of a machine learning algorithm, and factoring large numbers.

13. A device comprising:
at least one processor, and
at least one memory comprising computer program code for one or more programs;
the at least one processor, the at least one memory, and the computer program code configured to cause the device to at least carry out the following:
provide an equation with a cost function for minimization related to an optimization problem thereby yielding a cost function equation, the cost function equation including a plurality of discrete variables;
convert the cost function equation with the plurality of discrete variables into an Unconstrained Optimization, UO, problem;
provide a Tensor Network, TN, with tensors such that the TN covers all possible configurations of variables of the UO problem;
provide a set of parameters and modify coefficients of each tensor of the TN at least once for the provided set of parameters and such that, when modifying the coefficients of any tensor, a value of the cost function of the UO problem is reduced, the set of parameters relating to at least one of: at least one parameter modifying the TN, and at least one parameter that influences the modification of coefficients;
repeat the modification of coefficients for the provided set of parameters until first one or more predetermined criteria are met, the first one or more predetermined criteria relating to at least one of: the value of the cost function of the UO problem, and a number of times that the modification of coefficients has been conducted for the provided set of parameters;
store at least the value of the cost function associated with the provided set of parameters every time the first one or more predetermined criteria are met;
repeat the provision of the set of parameters and modification of coefficients one or more times, each time providing a different set of parameters so as to allow further reduction in the value of the cost function;
check, when the coefficients of the tensors have been modified for at least two provided sets of parameters and every time the first one or more predetermined criteria are met, whether the value of the cost function last stored meets a second predetermined criterion, the second predetermined criterion relating to a convergence reached in the value of the cost function based on one or more other values of the cost function stored;
at least one of the following, every time the second predetermined has not been met in the check:
repeat the provision of the set of parameters and modification of coefficients with a different set of parameters thereby allowing further reduction in the value of the cost function, the different set of parameters relating to at least one of: at least one parameter modifying the TN, and at least one parameter that influences the modification of coefficients; and
change the first one or more predetermined criteria and repeating the modifying step for the provided set of parameters;
solve, when the second predetermined criterion has been met in the check, the UO problem using the TN and provide respective values of the plurality of discrete variables of the cost equation.

14. The device of claim 13, further comprising at least one quantum processor for modifying the coefficients of the tensors of the TN.

15. The device of claim 13, further comprising at least one classical processor for modifying the coefficients of the tensors of the TN.

16. The device of claim 13, wherein the at least one processor, the at least one memory, and the computer program code configured to further cause the device to carry out the following:
provide at least one command to or actuating an apparatus or system for configuration thereof, the at least one command or actuation being based on the provided respective values of the plurality of discrete variables.

17. The device of claim 16, wherein the plurality of discrete variables relates to one or more devices of the apparatus or system, and wherein the at least one command is provided to or the actuation is made on one of the following: at least one device of said one or more devices, at least one device different from said one or more devices, and a combination thereof.

18. The device of claim 13, wherein the modification of coefficients of each tensor comprises: selection of a tensor of the TN that, for the provided set of parameters, either has not been previously selected for modification of coefficients or has been previously selected for modification of coefficients equal or fewer times than any other tensor of the TN, modification of the coefficients of the selected tensor such that the tensor with modified coefficients reduces the value of the cost function of the UO problem, and repetition of said selection of the tensor and modification of the coefficients of the selected sensor for each tensor of the TN at least once.

19. The device of claim 13, wherein the optimization problem relates to an optimization problem for one of: control of a factory, control of a production line, control of a machine, control of logistics, control of scheduling, routing, portfolio optimization, financial equilibrium, training of a machine learning algorithm, and factoring large numbers.

20. A non-transitory computer-readable medium encoded with instructions that, when executed by at least one processor or hardware, make an apparatus to at least perform the following steps:
providing an equation with a cost function for minimization related to an optimization problem thereby yielding a cost function equation, the cost function equation including a plurality of discrete variables;
converting the cost function equation with the plurality of discrete variables into an Unconstrained Optimization, UO, problem;

providing a Tensor Network, TN, with tensors such that the TN covers all possible configurations of variables of the UO problem;

providing a set of parameters and modifying coefficients of each tensor of the TN at least once for the provided set of parameters and such that, when modifying the coefficients of any tensor, a value of the cost function of the UO problem is reduced, the set of parameters relating to at least one of: at least one parameter modifying the TN, and at least one parameter that influences the modification of coefficients;

repeating the modifying step for the provided set of parameters until first one or more predetermined criteria are met, the first one or more predetermined criteria relating to at least one of: the value of the cost function of the UO problem, and a number of times that the modifying step has been conducted for the provided set of parameters;

storing at least the value of the cost function associated with the provided set of parameters every time the first one or more predetermined criteria are met;

repeating the providing the set of parameters and modifying steps one or more times, each time providing a different set of parameters so as to allow further reduction in the value of the cost function;

when the coefficients of the tensors have been modified for at least two provided sets of parameters and every time the first one or more predetermined criteria are met, checking whether the value of the cost function last stored meets a second predetermined criterion, the second predetermined criterion relating to a convergence reached in the value of the cost function based on one or more other values of the cost function stored;

every time the second predetermined has not been met in the checking step, at least one of:

repeating the providing the set of parameters and modifying steps with a different set of parameters thereby allowing further reduction in the value of the cost function, the different set of parameters relating to at least one of: at least one parameter modifying the TN, and at least one parameter that influences the modification of coefficients; and changing the first one or more predetermined criteria and repeating the modifying step for the provided set of parameters;

when the second predetermined criterion has been met in the checking step, solving the UO problem using the TN and providing respective values of the plurality of discrete variables of the cost equation.

* * * * *